United States Patent [19]

Block et al.

[11] Patent Number: 5,497,856

[45] Date of Patent: Mar. 12, 1996

[54] LOCKING CASTER BRAKE ASSEMBLY

[75] Inventors: Vurl D. Block, Waldenburg; Robert K. Hamilton, Jonesboro, both of Ark.

[73] Assignee: Colson Caster Corporation, Jonesboro, Ark.

[21] Appl. No.: 298,874

[22] Filed: Aug. 31, 1994

[51] Int. Cl.⁶ ..................................................... B60B 33/00
[52] U.S. Cl. ............................................. 188/1.12; 188/68
[58] Field of Search ............................... 188/1.12, 29, 31, 188/68–69, 265; 16/35 R

[56] References Cited

U.S. PATENT DOCUMENTS

| | | | |
|---|---|---|---|
| 1,785,421 | 12/1930 | Nielsen | 188/68 X |
| 2,262,433 | 11/1941 | Uecker et al. | 188/68 X |
| 2,484,094 | 10/1949 | Jackson | 188/77 R |
| 2,709,828 | 6/1955 | Noelting et al. | 188/1.12 X |
| 3,493,085 | 2/1970 | Libhart | 188/74 |

*Primary Examiner*—Josie Ballato
*Attorney, Agent, or Firm*—Jon Carl Gealow; Keck, Mahin & Cate

[57] ABSTRACT

A foot operated locking brake mechanism for preventing the rotation of a caster wheel supported on an axle within a wheel fork. A pair of support members secured to the legs of the wheel fork extend radially outward of the caster wheel. The legs of a U-shaped operating member are pivotally supported on the support members radially inward of the outer circumference of the caster wheel. A brake pad support arm is pivotally mounted on the support members radially outward of the outer circumference of the caster wheel. A cam follower which is supported between the legs of the U-shaped member engages a cam surface provided on the brake pad support arm when the U-shaped member is pivoted to move the cam follower closer to the caster wheel. When the cam follower is engaged with the cam surface, a brake pad carried by the brake support arm is locked in engagement with the caster wheel tread.

7 Claims, 1 Drawing Sheet

LOCKING CASTER BRAKE ASSEMBLY

BACKGROUND OF THE INVENTION

I. Field of the Invention

A foot operated locking brake mechanisms for preventing the rotation of a caster wheel.

II. Description of Related Art Including Information Disclosed Under 37 CFR Secs. 1.97 & 1.98

Casters are frequently provided on carts, hoppers, racks, and other similar structures which are subject to frequent moving, but are too heavy to carry. However, once placed in a desired position, further movement of the structure which might be caused by a pushing or pulling force applied to it, or by gravitational force should the structure be located on a non-level surface, is not desirable. In such cases it is desirable to lock the wheels of the casters to prevent their rotation, thereby preventing undesirable movement of the structure.

Foot operated brake mechanisms, which may be locked in the braking position to prevent rotation of caster wheels have been provided in the past. U.S. Pat. No. 3,493,085 granted the Anthony C. Libhart, and assigned to The Colson Company, a predecessor of the assignee of this application, reveals such a foot operated locking brake mechanism. The foot operated locking brake mechanism set forth in the Libhart patent was an improvement over the positive locking caster wheel brakes disclosed in earlier U.S. Pat. No. 2,262,433 to Uecker et al., U.S. Pat. No. 2,484,094 to Jackson and U.S. Pat. No. 2,709,828 to Noelting et al.

SUMMARY OF THE INVENTION

It is an object of this invention to provide a locking brake mechanism for preventing the rotation of a caster wheel which is readily operated by a persons foot. It is a further object of this invention to provide a foot operated caster wheel locking brake mechanism which is readily fabricated from a minimum number of parts, and readily assembled to a caster. It is a still further object of this invention to provide a foot operated locking brake mechanism for a caster wheel which may be readily adjusted so as to maintain the desired pressure between the braking surface and the caster wheel as the wheel tread and the braking surface experience wear.

In accordance with this invention, a foot operated caster wheel locking brake mechanism is provided which is readily used with a caster assembly including a wheel positioned within a wheel fork and carried on an axle supported by the wheel fork. The mechanism includes a pair of space mounting arms located on opposite sides of the wheel, with each arm being secured in a fixed position with respect to the wheel fork. The mounting arms, each of which is positioned on the outside of one of the fork arms, extend beyond the outer circumference or tread of the caster.

A U-shaped operating member, having a base and a pair of legs, is pivotally supported on the mounting arms, with the base forming a foot pedal for actuation of the brake. Holes in axial alignment with each other are formed near the free end of each leg of the U-shaped member. Those holes are aligned with corresponding holes in the mounting arms to receive pivot pins about which the U-shaped member is pivoted. A cam follower, in the form of a cylindrical member is supported by and extends between the legs of the U-shaped member.

A brake pad support arm is located between and supported adjacent one end on the mounting arms for pivotal movement about an axis parallel to the central axis of the wheel. A brake pad supported by the other end of the brake pad support arm may be pivoted into and out of contact with the caster wheel tread. A cam surface or retaining notch is formed in the brake pad support arm between its ends for engaging and retaining the cam follower. When a force is applied to the brake pedal, pivoting it toward the caster wheel tread the brake pad support arm is engaged by the cam follower and depressed toward the caster wheel tread. After the brake pad comes into contact with the wheel tread to prevent turning of the wheel, further depression of the pedal will resiliently deform the brake pad support arm, and the cam follower will move along the surface of the support arm until it falls into the retaining notch, thereby locking the brake pad in engagement with the wheel tread.

A spring acting between one of the mounting arms and the brake pad support arm biased the brake pad away from the caster wheel tread. By lifting the foot pedal away from the wheel tread, the cam follower will be lifted out of the retaining notch in the support arm and the spring will return the brake pad support arm to the unlocked position.

The brake pad is secured to the brake pad support arm by an adjustable means, such as a threaded rod and a pair of nuts positioned on opposite sides of the support arm, so that the distance between the brake pad surface and the support arm may be increased to increase the force between the pad and the tread when the brake pad is locked in engagement with the wheel tread, and to compensate for wearing away of the brake pad and wheel tread.

Other objects and further details of that which is believed to be novel in the invention will be clear from the following description and claims taken with the accompanying drawing.

DETAILED DESCRIPTION OF THE PREFERRED EMBODIMENT

Figure 3:
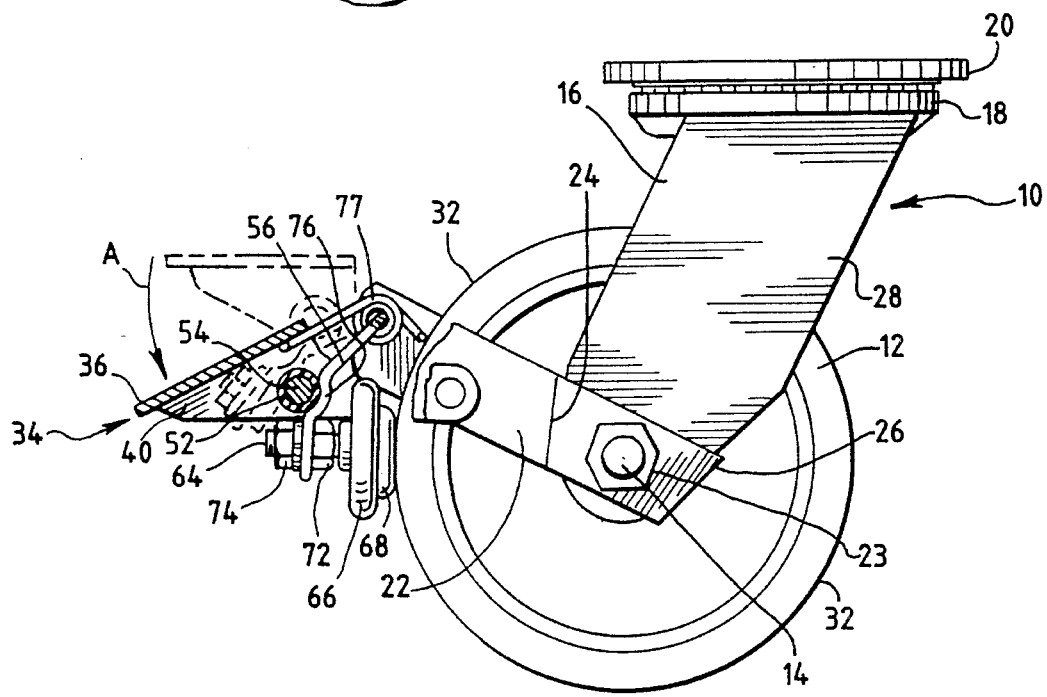
FIG. 3 is a side elevation view of the positive locking caster brake mechanism of this invention as shown in FIG. 1, with the brake shown in the locked position in solid lines and in the unlocked position in phantom.

Referring to the drawing, and particularly FIG. 3, a caster assembly 10 is shown including a caster wheel 12 supported by an axle 14 between the legs of a wheel fork 16. The wheel fork 16 has a base 18 which is shown to be pivotally secured to a mounting plate 20. Typically roller bearings are interposed between the base 18 and the mounting plate 20. However, the positive locking mechanism of this invention is equally applicable to casters which are not pivotally mounted.

Figure 2:
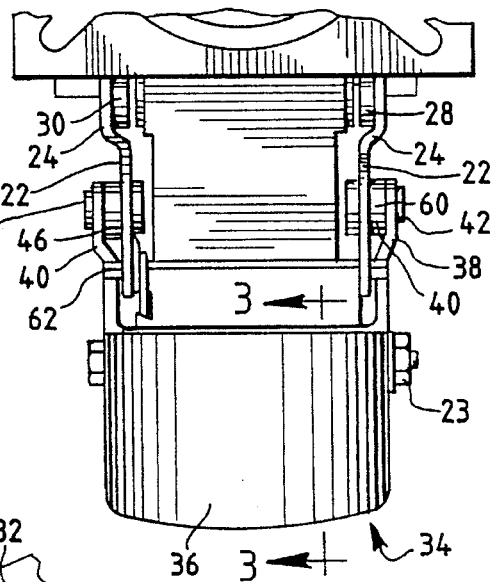
FIG. 2 is a front elevation view of the positive locking caster brake mechanism of this invention as shown in FIG. 1, with the lower portion of the wheel not shown.
Figure 1:
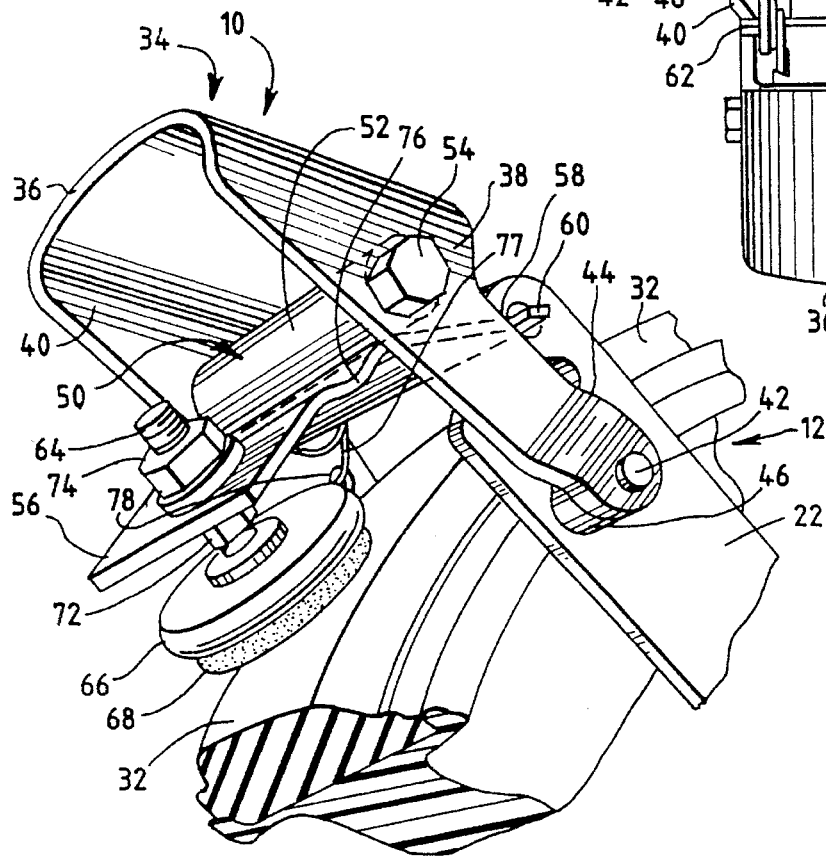
FIG. 1 is a perspective view of the foot operated positive locking caster brake mechanism of this invention as installed on a typical caster, showing only a portion of the caster wheel.

Referring to FIGS. 1–3, the positive locking brake mechanism in accordance with this invention includes a pair of mounting arms 22, which are secured to the caster assembly 10 by the axle 14, between an enlarged head on one end of the axle and a retaining nut 23 which is secured on threads provided on the other end of the axle. The mounting arms 22 are formed with offsets at 24 and 26, which engage the edges of the legs 28 and 30 of wheel fork 16, such that they are secured in fixed positions with respect to the wheel fork 16. The mounting arms extend radially outward with respect to the caster wheel 12, beyond the outer periphery of the tread 32 of the caster wheel 12.

A U-shaped operating member 34, having a base 36 and legs 38 and 40, is pivotally supported on the mounting arms 22 such that the base 36 extends over and is spaced radially outward from the wheel tread 32. Apertures are provided at the free end of the legs 38 and 40 for receiving suitable fastening means 42, such as rivets, which are also received in apertures formed in the mounting arms 22. The free ends of the legs 38 and 40 are offset at 44, such that a spacer 46 may be placed between the mounting arms 22 and the legs 38 and 40, such that they will be spaced from each other. The apertures formed in the mounting arms 22, for supporting the U-shaped operating member 34, are in axial alignment with each other, and have an axis which is parallel to the axis of the axle 14. The base 36 of the U-shaped member forms a foot pedal for actuation of the brake.

Supported by the legs 38 and 40 of the U-shaped operating member 34, between the base 36 and tread 32 of the wheel 12, is a cam follower 50, shown as a hollow cylindrical tube 52 supported for rotation on a bolt 54. The bolt 54 is received in a pair of holes formed in the legs 38 and 40. The axis of the bolt 54 and the cam follower 50 is parallel to the axis of the axle 14.

Pivotally supported by the mounting arms 22 is a brake pad support arm 56. A pair of holes are provided in the mounting arms 22, one of which 58 is shown in FIG. 1, to receive tabs 60 and 62 formed on the edges of the support arm 56, adjacent one of its ends. The tabs rotate in the holes as the brake pad support arm is pivoted about an axis passing through the holes. A hole is provided in the support arm 56, adjacent its other end, to receive a threaded member 64, to one end of which is secured a brake pad support member 66. Secured to the brake pad support member 66 is a brake pad 68. The spacing between the surface of the brake pad 68 and the support arm 56, may be adjusted by repositioning nuts 72 and 74 on the threaded cylindrical member 64. A cam surface or retaining notch 76 is formed in the brake pad support arm between its ends for engagement by the cam follower 50.

A coil spring 77 is placed over tab 62 with one end of the spring engaged in a hole 78 in support arm 22, and the other engaging the brake pad support arm 56 to rotate it in the clockwise direction as shown in FIG. 3, to hold the brake pad 68 away from the wheel tread 32.

Without the foot pedal 36 having been depressed, the brake pad 68 will be maintained in a position spaced from the wheel tread 32 as shown in FIG. 1 by the coil spring 77. As a downward force is applied to the foot pedal 36 as shown by the arrow A in FIG. 3, the cam follower 50 will move along the surface of the brake pad support arm 56 toward the cam surface or retaining notch 76, depressing the support arm 56 and bringing the brake pad 68 into engagement with the wheel tread 32. The support arm 56 is somewhat resilient, such that it will be deflected toward the wheel tread 32 where engaged by the cam follower 50, after the brake pad 68 has engaged the tread 32. As further force is applied to the foot pedal 36, the cam follower 50 will drop into the cam surface or notch 76 as shown in FIG. 3, and will be retained therein, since the force of the support arm 56 pushing on the cam follower 50 is directed radially outward, and does not provide a force tending to rotate the operating member 34 in a clockwise direction as viewed in FIGS. 1 and 3, to release the support arm 56 to return to its disengaged position under the force of the spring 77.

In order to release the brake from its locked engaged position, it is necessary to provide a force to the foot pedal 36 in the upward or clockwise direction as viewed in FIGS. 1 and 3. Such a force can be applied by placing the toe of one's shoe under the foot pedal 36 and applying an upward force.

It will be apparent that this brake assembly can either be affixed to the caster wheel fork 16 during manufacture of the caster, or else it can be sold as a separate unit and mounted on standard brakeless caster wheel forks at any time. The mounting of the brake assembly is accomplished merely by removing the axle 14, locating the mounting arms 22 on the legs 28 and 30 of the fork 16 and reinserting the axle 14 and securing it with the nut 23.

While one embodiment of the invention has been shown, it should be apparent to those skilled in the art that what has been described is considered at the present to be the preferred embodiment of the positive locking brake mechanism of this invention. In accordance with the patent statutes, changes may be made in the brake mechanism without actually departing from the true spirit and scope of this invention. The appended claims are intended to cover all such changes and modifications which fall within the true spirit and scope of this invention.

What is claimed is:

1. A positive locking brake mechanism for a caster wheel to prevent its rotation about an axle supported by a wheel fork, the wheel having a cylindrical peripheral surface, comprising:

A. a pair of mounting arms located on opposite sides of the wheel and secured in a fixed position with respect to the wheel fork, said pair of mounting arms extending radially beyond the cylindrical peripheral surface of the wheel, B. a U-shaped operating member, having a base and a pair of legs, said legs being pivotally supported on said pair of mounting arms, and said base forming a pedal for actuation of the brake mechanism, C. a cam follower supported by and extending between said pair of legs of said U-shaped operating member, D. a brake pad support arm having first and second ends located between said pair of mounting arms, and pivotally supported at said first end on said pair of mounting arms, a brake pad supported by said second end of said brake pad support arm, a retaining notch located on said support arm between said first and second ends, pivoting of said U-shaped operating member in a first direction causing said cam follower to engage and pivot said brake pad support arm about said first end to move said second end toward the cylindrical peripheral surface of the wheel such that said brake pad engages the cylindrical peripheral surface, further pivoting of said U-shaped operating member in the first direction causing said brake support arm to resiliently deform, still further pivoting of said U-shaped operating member causing said cam follower to engage and be retained in said retaining notch, thereby positively locking the caster wheel to prevent its rotation.

2. The mechanism for locking a wheel having a cylindrical peripheral surface, to prevent its rotation of claim 1, wherein a spring means engages one of said pair of mounting arms and said brake pad support arm to provide a spring force urging said second end of said brake pad support arm and said brake pad away from away from the cylindrical periphery of said wheel, such that unless a force is being applied to said U-shaped member to rotate it in the first direction, or said cam follower is engaged and retained by said retaining notch, said brake pad will be held away the cylindrical periphery of said wheel by the spring force such that said wheel will be free to turn.

3. The mechanism for locking a wheel having a cylindrical peripheral surface, to prevent its rotation of claim 1, wherein adjustable means are provided for supporting said brake pad on said second end of said brake pad support arm.

4. The mechanism for locking a wheel having a cylindrical peripheral surface, to prevent its rotation of claim 3, wherein said adjustable means includes a threaded cylindrical member, on one end of which is supported said brake pad.

5. The mechanism for locking a wheel having a cylindrical peripheral surface, to prevent its rotation of claim 1, wherein said cam follower is a hollow cylindrical member supported for rotation on a support member which passes through said hollow cylindrical member and extends between said pair of legs of said U-shaped operating member.

6. The mechanism for locking a wheel having a cylindrical peripheral surface, to prevent its rotation of claim 1, wherein said brake pad support arm is an elongated flat member and said retaining notch is formed by bending said elongated flat member between said first and second ends.

7. The mechanism for locking a wheel having a cylindrical peripheral surface, to prevent its rotation of claim 1, wherein said U-shaped member is pivotally supported on said mounting arms radially inward from the cylindrical peripheral surface of the wheel and said brake pad support arm is pivotally supported on said mounting arms radially outward from the cylindrical peripheral surface of the wheel.

* * * * *